US006477608B1

United States Patent
Sato (12)

(10) Patent No.: US 6,477,608 B1
(45) Date of Patent: Nov. 5, 2002

(54) INTERFACE CIRCUIT FOR TRANSFERRING DATA ON BUS BETWEEN MODULES OF INTEGRATED CIRCUIT WITH REDUCED DELAY

(75) Inventor: Junkei Sato, Sendai (JP)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/557,864

(22) Filed: Apr. 26, 2000

(51) Int. Cl.$^7$ ........................ G06F 13/14; H03K 19/003
(52) U.S. Cl. ........................ 710/305; 710/306; 326/21
(58) Field of Search ................................. 710/100, 300, 710/105–106, 305–315; 326/21–34, 82–92

(56) References Cited

U.S. PATENT DOCUMENTS

| | | | | |
|---|---|---|---|---|
| 5,787,310 A | * | 7/1998 | Shimizu et al. | 365/189.02 |
| 5,801,549 A | * | 9/1998 | Cao et al. | 326/23 |
| 6,181,165 B1 | * | 1/2001 | Hanson et al. | 326/58 |
| 6,246,259 B1 | * | 6/2001 | Zaliznyak et al. | 326/41 |

* cited by examiner

Primary Examiner—Sumati Lefkowitz
(74) Attorney, Agent, or Firm—Charles W. Bethards

(57) ABSTRACT

As the signal lines, such as the data bus, become longer, signal delay occurs due to the resistance and capacitance components of that bus. In order to minimize the effect due to this delay, the processing module is designed in consideration of the delay time.

An interface circuit 13 is provided in the bus to control the signal transfer. Data and so forth sent from the central processing unit is supplied directly to the extended bus without being delayed in the interface circuit. Data signals and so forth transferred to the central processing unit 11 is delayed for a predetermined time in the latch 25 of the interface circuit before being sent to the central processing unit. Because only the data signal to be sent to the central processing unit is latched, the size of the interface circuit can be minimized.

15 Claims, 4 Drawing Sheets

INTERFACE CIRCUIT FOR TRANSFERRING DATA ON BUS BETWEEN MODULES OF INTEGRATED CIRCUIT WITH REDUCED DELAY

FIELD OF THE INVENTION

The present invention relates to an interface circuit located between signal lines that transfer signals, and, more specifically, to a semiconductor device such that an interface circuit disposed between buses formed on a semiconductor chip facilitates smooth transfer of information among module circuits.

BACKGROUND OF THE INVENTION

With rapid advances in miniaturization technology for forming high-density semiconductor circuits on a semiconductor substrate, it has been possible to implement semiconductor integrated circuitry with high levels of functionality on a single semiconductor chip. Functions of the integrated circuitry are classified according to their purpose into, for example, a central processing circuit, a memory circuit, an input/output circuit, and so forth. These functions are subdivided into further details and implemented as module circuits. Users and manufacturers of integrated circuits select from those module circuits functions to achieve their purpose and implement on a semiconductor substrate a single integrated circuit for achieving their desired functionality.

These module circuits are required to exchange information with each other in order to realize their functionality and are connected to signal lines, or so-called buses, for transmitting such information to and from each other. The buses are classified into address buses, data buses, control buses, and so forth according to the information transmitted.

Resistance and stray capacitance of the signal line itself delay the signal propagating over the bus. Increases in operating frequency, along with increased density of integrated circuitry, have led to a situation where the wiring distance of the bus is restricted. Delays in signal propagation and degradation in signal waveforms make it difficult to maintain the overall operation of the integrated circuitry as appropriate, thus resulting in malfunction. In order to address such a problem, an interface circuit is provided on the bus to send and receive signals; the above problem is prevented by shortening the transmission length of the bus. For example, as disclosed in Japanese Patent Laid-Open No. 8-123591 (Multiplexed Bus Circuit), a circuit portion is disposed on a bus to shorten the transmission length of the bus, thereby preventing degradation in signal waveforms and decreases in time margin.

However, the afore-mentioned circuit portion employs such an arrangement that address, data and control information propagating over the bus is temporarily stored in a latch circuit and sent over the bus after a predetermined number of clock cycles. Especially, address and data information is bidirectionally latched, so that it is sent over the bus after a predetermined number of clock cycles. With such an arrangement, for example, when the data stored in the memory is to be fetched, at least two delays are introduced in said circuit portion until desired data is fetched by the central processing unit after a fetch instruction of the central processing unit is sent, thereby unnecessarily reducing the overall processing speed of the integrated circuitry.

SUMMARY OF THE INVENTION

The present invention is intended to overcome the above problem and provides an interface wherein for information sent from a central processing unit, no time delay is introduced in an interface circuit, while for information sent from a extended bus to the central processing unit, a predetermined time delay is introduced in the interface circuit, thereby ensuring a transmission length of the overall bus and alleviating reductions in overall processing speed of the integrated circuitry.

DESCRIPTION OF A PREFERRED EMBODIMENT

Figure 1:
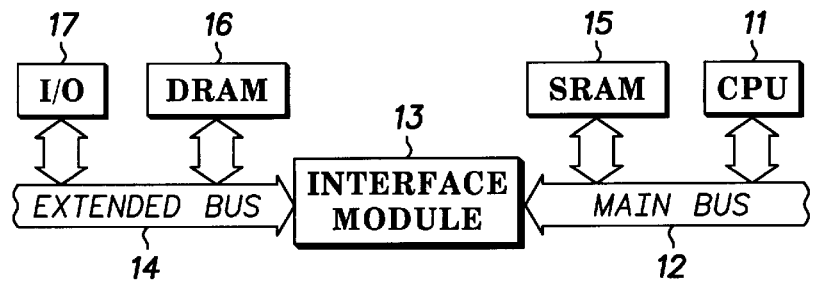
FIG. 1 is a block diagram for explaining the overall configuration of the present invention.

The arrangement and features of the present invention will be understood with reference to the description hereinbelow and its accompanying drawings. FIG. 1 is a block diagram for explaining the present invention, specifically illustrating a integrated circuit 10 having a bus architecture that uses an interface module. With the present invention, a bus connected to a central processing unit (CPU) 11 is referred to as a main bus 12, while a bus configured via an interface module 13 is referred to as an extended bus 14, although they are not specifically limited thereto; a bus coupled to a processing module sophisticated enough to process information (corresponding to the CPU 11 in FIG. 1) is referred to herein as a main bus. In FIG. 1, for simplicity of explanation, in addition to the CPU 11, a static random access memory (SRAM) 15 is coupled to the main bus 12, although any other processing modules may be connected thereto. To the extended bus 14 are connected a dynamic random access memory (DRAM) 16 and input/output (I/O) port 17. Any other processing modules may be coupled thereto, although they are omitted for simplicity.

The CPU 11 issues instructions to the SRAM 15, DRAM 16, and I/O port 17 in order to execute processing according to program steps, and these instructions are transmitted to a predetermined processing module via the main bus 12, interface module 13 and extended bus 14. The interface module 13 passes information, such as instructions from the CPU 12, directly to the extended bus 14 for transmission to a predetermined processing module. When the processing module sends, for example, information stored at a predetermined address in the DRAM 16 to the CPU 11, that information is sent from the DRAM 16 to the data bus in the extended bus 16 and conveyed to the interface module 13. The interface module 13 retains the received data for a predetermined period of time and then outputs it to the main bus 12. The predetermined period of time may be readily counted in synchronization with a clock cycle, for example. The output data is acquired by the CPU 11 from the main bus to complete a series of processing sequences for data acquisition.

Figure 2:
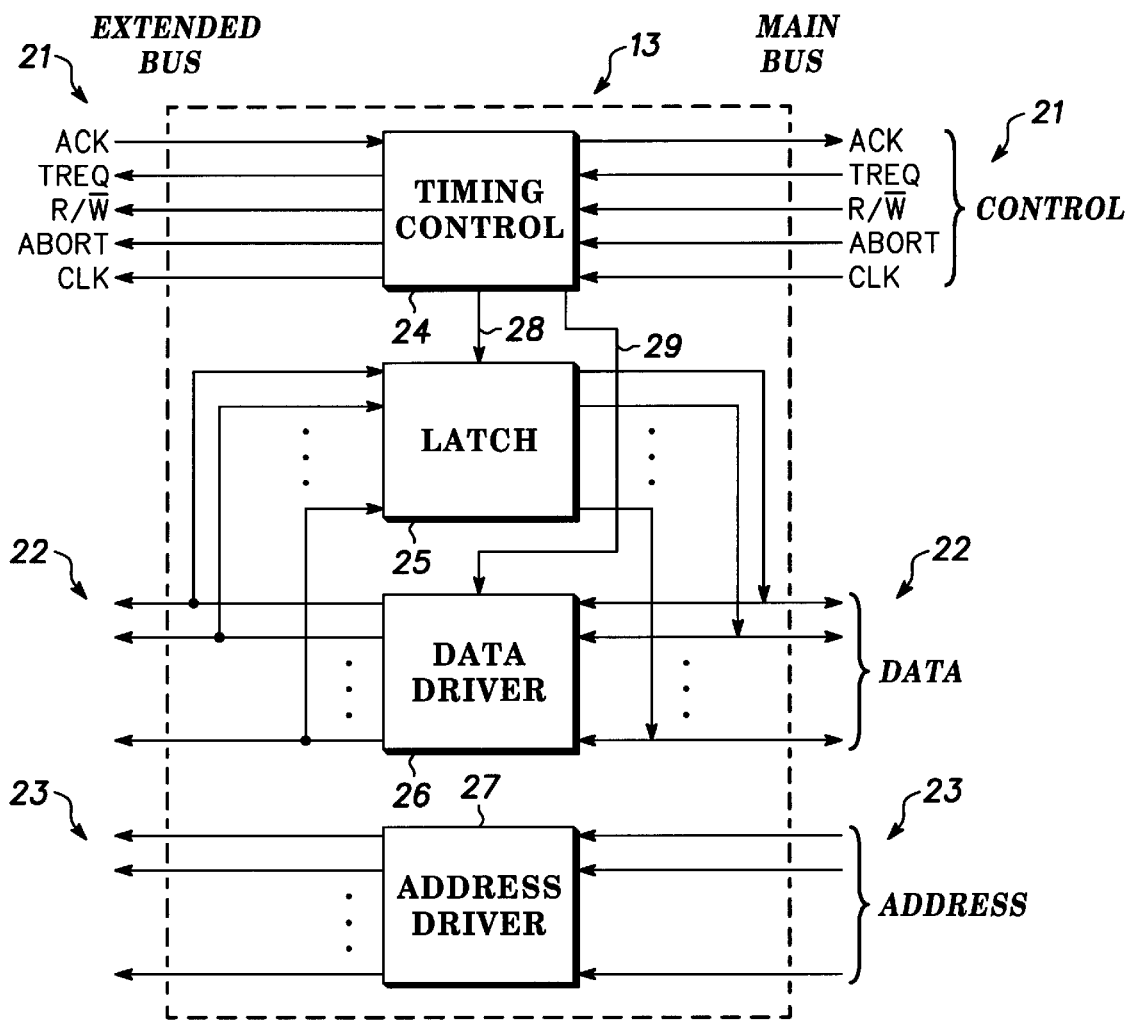
FIG. 2 is a detailed block diagram illustrating one embodiment of the interface module according to the present invention.

FIG. 2 is a detailed block diagram of the interface module 13. The main bus 12 and extended bus 14, which are connected to the interface module 13, are comprised of a control bus 21, a data bus 22, and an address bus 23, as shown in FIG. 2. Each bus is classified according to the content of the signal, and is used as a path for transmitting various control signals, data information, and address information, respectively. The internal structure of the interface module 13 may be mainly divided into three circuit blocks coupled, respectively, to the control bus 21, data bus 22, and address bus 23. That is, the interface module 13 has timing control 24 connected to the control bus 21; a latch 25 and a data driver 26 connected to the data bus 22; and a address driver 27 connected to the address bus 23. The timing control 24, latch 256, data driver 26, and address driver 27 have typical input and output circuit portions that may be readily configured by those of ordinary skill in the art, and are connected to the control, data, and address buses, respectively. When predetermined control signals meet certain criteria, the timing control 24 sends the control signals via signal lines 28 and 29 to the latch 25 and data driver 26, respectively. The latch control signal sent via the signal line 28 provides timing for storing the data information over the data bus 22 on the extended bus 14 side into a memory portion within the latch 25. Furthermore, the data control signal supplied from the signal line 29 is a signal for switching the transmission direction of the data information over the data bus 22 and stops the operation of the data driver 26 during a period when the data information stored in the latch 25 is sent to the data bus 22 on the main bus 12 side. This prevents the data sent to the data bus 22 on the main bus 12 side from returning to the data bus 22 on the extended bus 14 side.

Figure 3:
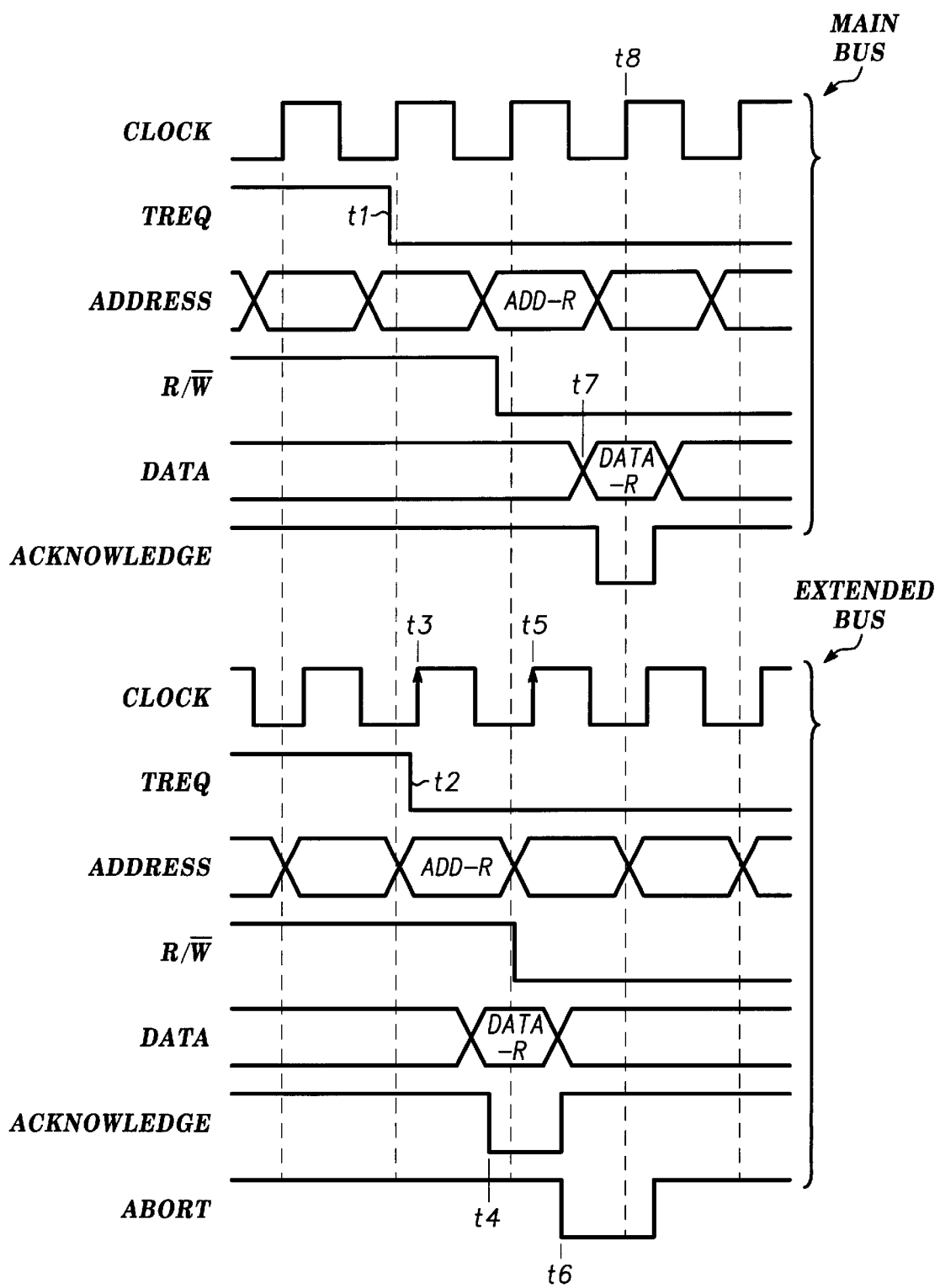
FIG. 3 shows a timing sequence for the central processing unit to read the data stored in the DRAM.
Figure 4:
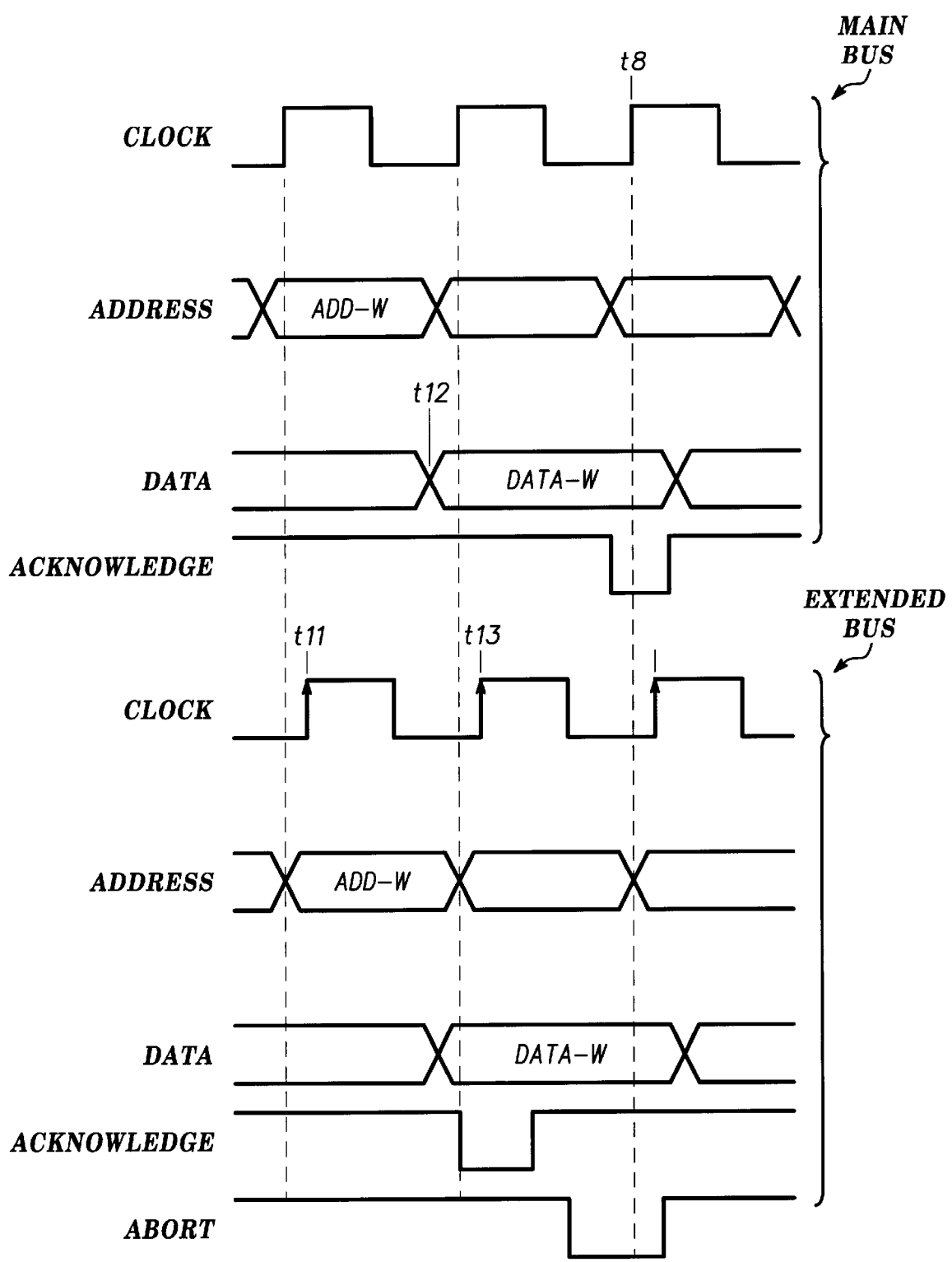
FIG. 4 shows a timing sequence for the central processing unit to write data to the DRAM.

Next, the operation of the interface module 13 is described with reference to the timing charts of FIGS. 3 and 4. First, a processing sequence where the CPU 11 acquires the data stored in the DRAM 16 connected to the extended bus 14 is described. FIG. 3 shows a sequence where the CPU 11 reads the data stored in the DRAM 16, illustrating signal waveforms on the main bus 12 and extended bus 14, respectively. The signal waveforms on the extended bus exhibit slight transmission delays due to resistance and stray capacitance, etc. of the signal lines because they are located away from the CPU 11; however, in order to facilitate understanding, delays of the signal waveforms on the main bus 12 and extended bus 14 are emphasized in FIG. 3.

The CPU 11 advances processing steps with reference to a clock (CLK) signal generated internally or externally. When the CPU 11 reads the data stored in the DRAM 16, the address (ADD-R) signal is sent to the address bus 23, and a TREQ signal, a kind of control signal indicative of a data transfer request, is asserted (meaning that the signal is rendered logically "true"; that is, the signal level goes from high to low herein) at time t1. Furthermore, a read/write signal (R/W̄ signal) indicative of whether the CPU 11 is in read mode or in write mode is asserted (the signal level is held at high level) during a period when the address signal is effectively output. The above TREQ signal and read/write signal are transmitted via the timing control 24 to the control bus on the extended bus 14 side. Similarly, the address signal is sent via the address driver 27 to the address bus 23 on the extended bus 14 side. Because the main bus 12 and extended bus 14 have a slight time delay, the TREQ signal asserted at time t1, for example, is asserted at time t2 on the extended bus.

The clock signal and address signal are also transmitted to the extended bus, similarly through a time delay, and provided to the DRAM 16. The DRAM 16 fetches the address signal at a time when the clock signal transits at time t3, and outputs the data (DATA-R) signal stored at that address to the data bus 22, while a acknowledge (ACK) signal indicating that the resulting data signal has been sent properly is asserted at time t4 (the signal level goes low). The timing control 24 receives the acknowledge signal and acquires the data signal on the data bus at a time when the clock signal transits from low to high at time t5, and stores it a predetermined storage location. While the data signal is output, the acknowledge signal is asserted. At the same time when the data signal output is completed at time t6, the acknowledge signal is also ended. The end thereof results in the generation of an abort (ABORT) signal, which serves to inhibit the activation of other processing modules during a predetermined period of time until at least the CPU 11 completes the read mode.

The timing control 24 sends the data signal stored to the data bus 22 on the main bus 12 side at time t7 when a predetermined period of time, for example, one cycle of the clock signal, has passed. It should be understood that in the present embodiment, the configuration is shown where the data signal is retained for one cycle of the clock signal, although a configuration is possible where a delay that is shorter than one cycle of the clock signal is introduced, because a reference signal with a shorter cycle than the clock signal is normally generated. At the same time with the transmission of the data signal, the timing control 24 generates an acknowledge signal, which is output to the main bus 12. After confirming that the acknowledge signal is asserted (the signal level is low), the CPU 11 acquires the data signal transmitted on the data bus 22 at a time t8 when the clock signal transits from low to high. This acquisition causes the CPU 11 to complete a series of read mode operations.

For the data described above, in the read mode, the address signal, control signal, etc. sent from the CPU 11 are immediately transferred, upon reception, to the extended bus by the interface module 13 without being temporarily stored therein; however, the signal transmitted from the extended bus to the main bus is stored for a predetermined period of time before being output to the main bus.

Next, processing steps in write mode where the CPU 11 writes data to the DRAM 16 are described with reference to FIGS. 2 and 4. FIG. 4 is a timing chart illustrating signal waveforms on the signal lines over the main bus 12 and extended bus 14, respectively, as in FIG. 3.

The CPU 11 outputs to the address bus 23 an address (ADD-W) signal for the data to be written. This address signal is conveyed via the address driver 27 of the interface module 13 to the address bus 23 on the extended bus side. The DRAM 16 acquires this address signal at time t11 when the clock signal transits from low to high. The CPU 11 sends a write data (DATA-W) signal to the data bus at time t12, one cycle after time t11. This data signal is transmitted via the data driver 26 to the data bus on the extended bus 14 side. The DRAM 16 inputs the data signal on the data bus at time t13 when the clock signal transits from low to high, and writes the data at a predetermined address corresponding to the address signal already acquired. Once the data is stored, the DRAM 16 outputs to the CPU 11 an acknowledge signal indicating that the data has been written properly. This acknowledge signal is sent to the main bus 12 after it is latched for a predetermined period of time, as described in the read mode, thereby notifying the CPU 11 that the data has been written appropriately. Furthermore, the interface module 13 generates an abort signal to prevent activation of other modules during a period when the data signal resides on the data bus after the acknowledge signal has been output. As the acknowledge signal is received by the CPU 11, the write mode of the CPU 11 is completed.

Figure 5:
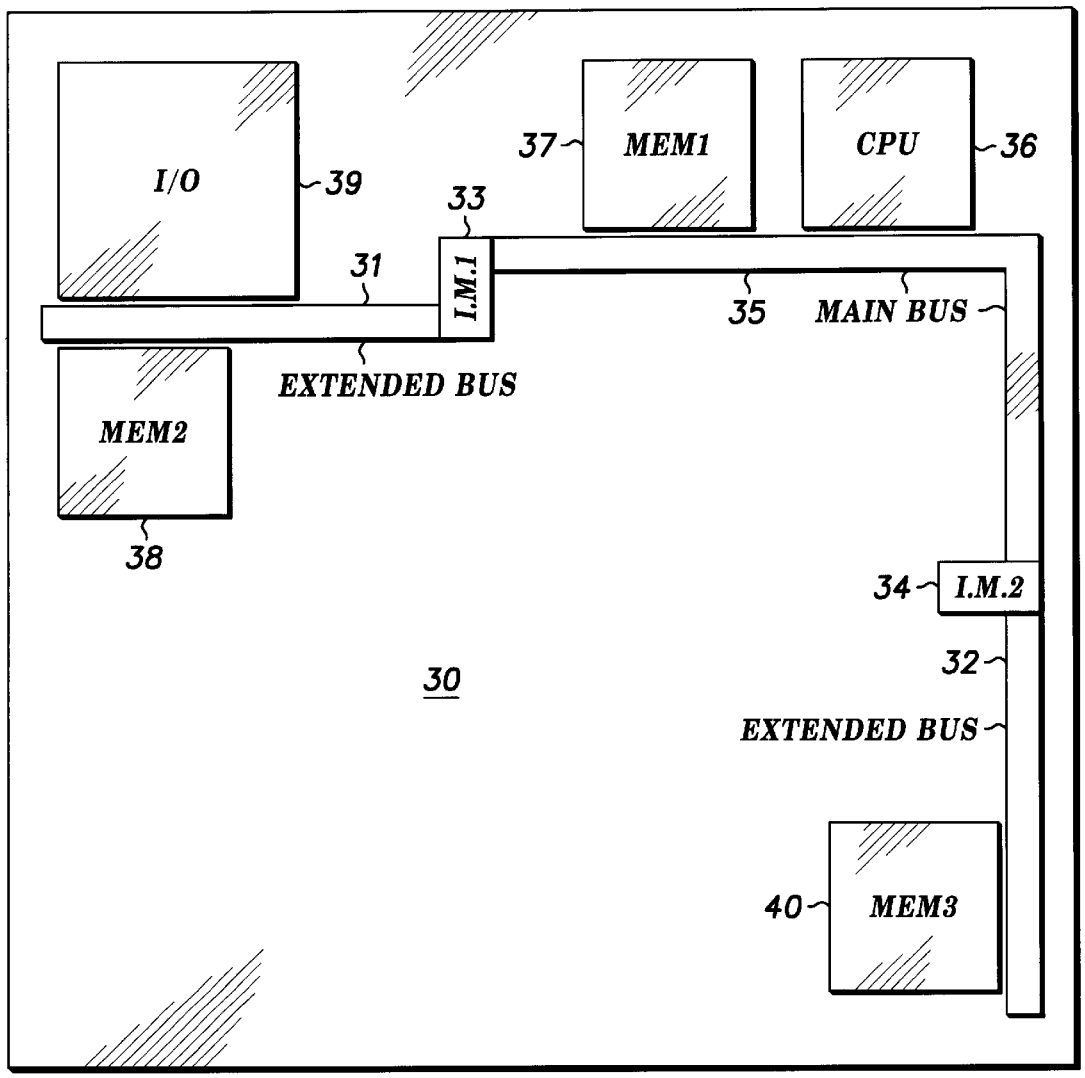
FIG. 5 is a plan view illustrating the arrangement of the interface module and processing module on the semiconductor substrate.

Next, how the present invention is arranged on a semiconductor chip is shown in FIG. 5. FIG. 5 shows a plan view of a semiconductor chip 30 as seen from above. The main bus and extended bus may be arranged in any way, depending on the processing modules connected thereto, in other words, depending on the functionality imparted to the integrated circuitry; in FIG. 5, there is shown how two extended buses 31 and 32 are coupled to a main bus 35 via interface modules 33 and 34. To the main bus 35 are connected a CPU 36 and a memory 37. To the extended bus 31 are connected a memory 38 and an I/O 39, and to the extended bus 32 is connected a memory 40. In FIG. 5, a case where the extended buses are connected to the main bus is illustrated, although it is readily possible for those of ordinary skill in the art that an extended bus may be further coupled via an interface module to the extended bus, thereby extending the bus.

As described above, an arrangement wherein an interface circuit is located between signal lines so that a delay is provided only to signals in one direction, while signals in the other direction are immediately transmitted without time delay, is employed, thereby permitting simplification of circuit architecture of the interface circuit, as well as cost reduction. Furthermore, because the signal lines may be extended by use of the interface circuit, an electronic device with greater functionality may be configured. Additionally, because circuits with various functions may be connected to the extended signal lines regardless of transmission characteristics of the signal lines, the development period for electronic devices may be shortened.

What is claimed is:

1. An interface circuit located between signal lines formed within an electronic device, said interface circuit comprising:
   a first driver circuit for receiving first data information transferred from a central processing unit onto a data bus and for sending said first data information to said data bus on an extended bus side without delaying it;
   a control circuit for receiving a control signal from a control line among said signal lines and for generating a data latch signal to control the transfer of second data information over said data bus on the extended bus side; and
   a data latch circuit for storing said second data information in response to said data latch signal and for sending said second data information to said data bus on a main side after a first predetermined time has passed.

2. The interface circuit according to claim 1, wherein said first predetermined time is one cycle of clock signal among said control signals.

3. The interface circuit according to claim 1, wherein said data latch circuit stores said second data information during a time when an acknowledge signal indicating that said second data information has been effectively sent to said data bus is present in said control line.

4. The interface circuit according to claim 3, wherein said acknowledge signal is sent to said control line from a module circuit coupled to said signal line for executing a specific process.

5. The interface circuit according to claim 3, wherein said control circuit delays said acknowledge signal by said first predetermined time before sending it to said control line.

6. The interface circuit according to claim 4, wherein said control circuit sends to said control line an abort signal to inhibit the activation of the process by said module during a predetermined period after said acknowledge signal has been received.

7. The interface circuit according to claim 1, wherein said control circuit provides said control signal transferred from said central processing unit to said control line on said extended side without delaying it, while said control signal over said control line on said extended bus side is sent to said control line on the central processing unit side after a second predetermined time has passed since it was latched.

8. The interface circuit according to claim 7, wherein said second predetermined time is one cycle of clock signal among said control signals.

9. The interface circuit according to claim 1, wherein said control circuit generates and provides to said first driver circuit a signal for inhibiting the activation of said first driver circuit during a period of time when the data signal over the data bus on said extended side is transferred to the central processing unit.

10. The interface circuit according to claim 1, further comprising a second driver circuit for receiving address information on an address bus and sending said address information to said address bus without delaying it.

11. The interface circuit according to claim 1, wherein said interface circuit is formed on a single semiconductor substrate.

12. An integrated circuit formed on a semiconductor substrate, comprising:
    a first plurality of module circuits for executing specific processes, respectively, said first plurality of module circuits including a central processing unit;
    first signal lines coupled to said first plurality of module circuits, respectively, for transmitting address information, data information, and control signals;
    a second plurality of module circuits for executing specific processes, respectively;
    second signal lines coupled to said second plurality of module circuits, respectively, for transmitting said address information, said data information, and said control signals; and
    an interface circuit located between said first signal lines and said second signal lines for sending and receiving said address information, said data information, and said control signals therebetween, said interface circuit sending without delay said data information on said first signal lines to said second signal lines and storing said data information on said second signal lines and then sending said data information to said first lines after a predetermined time has passed.

13. The integrated circuit according to claim 12, wherein said interface circuit acquires said data information on said second signal lines and then sends said second data information to said first signal lines after delaying it by one cycle of clock signal among said control signals.

14. The integrated circuit according to claim 12, wherein said first signal lines are coupled to third signal lines via a second interface circuit having identical or equivalent functionality to said interface circuit, so that said address information, said data information, and said control signals are transferred to and from said second signal lines and said third signal lines.

15. The integrated circuit according to claim 12, wherein said first and second plurality of modules circuits have predetermined areas occupied on said semiconductor substrate, respectively, and said first and second signal lines are disposed between said first and second plurality of module circuits.

* * * * *